(12) United States Patent  
Motooka et al.

(10) Patent No.: US 11,998,143 B2  
(45) Date of Patent: Jun. 4, 2024

(54) HEAT-INSULATED CONTAINER FOR BEVERAGES

(71) Applicant: SANKEI GIKEN KOGYO CO., LTD., Tokyo (JP)

(72) Inventors: Shinya Motooka, Tokyo (JP); Shingo Goto, Tsu (JP)

(73) Assignee: SANKEI GIKEN KOGYO CO., LTD., Tokyo (JP)

( * ) Notice: Subject to any disclaimer, the term of this patent is extended or adjusted under 35 U.S.C. 154(b) by 76 days.

(21) Appl. No.: 17/920,463

(22) PCT Filed: Mar. 20, 2021

(86) PCT No.: PCT/JP2021/011556  
§ 371 (c)(1),  
(2) Date: Feb. 14, 2023

(87) PCT Pub. No.: WO2021/235072  
PCT Pub. Date: Nov. 25, 2021

(65) Prior Publication Data  
US 2023/0218113 A1   Jul. 13, 2023

(30) Foreign Application Priority Data

May 18, 2020   (JP) .................. 2020-086798

(51) Int. Cl.  
*A47J 41/02* (2006.01)  
*A45F 3/18* (2006.01)

(52) U.S. Cl.  
CPC .............. *A47J 41/022* (2013.01); *A45F 3/18* (2013.01)

(58) Field of Classification Search  
CPC .......... A47J 41/022; A47J 41/02; A47J 41/00; B65D 81/3865; B65D 81/3869; B65D 81/3874  
See application file for complete search history.

(56) References Cited

U.S. PATENT DOCUMENTS

| 2012/0018343 A1 | 1/2012 | Carland |
| 2013/0119075 A1 | 5/2013 | Justiss |

FOREIGN PATENT DOCUMENTS

| JP | 2003-235739 A | 8/2003 |
| JP | 2014-110 A | 1/2014 |

OTHER PUBLICATIONS

International Search Report dated Apr. 20, 2021, issued in counterpart International Application No. PCT/JP2021/011556. (2 pages).

*Primary Examiner* — Don M Anderson  
(74) *Attorney, Agent, or Firm* — WHDA, LLP (57) ABSTRACT

A heat-insulated container for beverages includes: a wooden or bamboo inner cylinder having a substantially cylindrical shape with a closed bottom; a wooden or bamboo outer cylinder having a substantially cylindrical shape with a closed bottom; and a fit body where decompressed space is provided between an inner wall having a substantially cylindrical shape with a closed bottom and an outer wall having a substantially cylindrical shape with a closed bottom. The fit body is fitted over the inner cylinder in such a manner as to cover a bottom part and a peripheral wall part around beverage storage space of the inner cylinder. The outer cylinder is fitted over the fit body in such a manner as to cover a bottom part and a peripheral wall part of the outer wall of the fit body.

16 Claims, 4 Drawing Sheets

HEAT-INSULATED CONTAINER FOR BEVERAGES

TECHNICAL FIELD

The present invention relates to a heat-insulated container for beverages having a heat insulation function such as a water bottle, for example.

BACKGROUND ART

A water bottle having a heat insulation function conventionally known such as that shown in Patent Literature 1 has a double structure including a metallic inner container having a substantially cylindrical shape with a closed bottom and a metallic outer container having a substantially cylindrical shape with a closed bottom, and decompressed heat-insulated space is provided between the inner container and the outer container. With the presence of the decompressed heat-insulated space, this water bottle exerts the excellent effect of keeping warm and keeping cool on beverages stored in the inner container.

PRIOR ART LITERATURE

Patent Literature

Patent Literature 1: Japanese Patent Application Publication No. 2014-110

SUMMARY OF INVENTION

Problem to be Solved by Invention

Meanwhile, for the purpose of fixing a growing environment to encourage sound growth of trees in forests, thinning has been done to cut some trees. However, discarded thinning of leaving a material from thinning without carrying the material out has been done in terms of the cost of carrying out and such thinning is coming into question. Hence, forming products from a material resulting from thinning to encourage effective use of such a material is becoming an extremely important issue to be solved. Furthermore, in response to increased variety of and more individualized demand from consumers in recent years, providing outer appearances with the beauty of wood and providing products of increased individuality are desired further for heat-insulated containers for beverages such as water bottles.

The present invention is suggested in view of the foregoing problems to be solved. An object of the present invention is to provide a heat-insulated container for beverages having high heat insulation performance and usable for encouraging effective use of wood or bamboo as a material resulting from thinning and the like. Another object of the present invention is to provide a heat-insulated container for beverages having a considerably high degree of individuality and an outer appearance with the beauty of wood or bamboo.

Means of Solving Problem

A heat-insulated container for beverages of the present invention includes: a wooden or bamboo inner cylinder having a substantially cylindrical shape with a closed bottom; a wooden or bamboo outer cylinder having a substantially cylindrical shape with a closed bottom; and a fit body where decompressed space is provided between an inner wall having a substantially cylindrical shape with a closed bottom and an outer wall having a substantially cylindrical shape with a closed bottom, wherein the fit body is fitted over the inner cylinder in such a manner as to cover a bottom part and a peripheral wall part around beverage storage space of the inner cylinder, and the outer cylinder is fitted over the fit body in such a manner as to cover a bottom part and a peripheral wall part of the outer wall of the fit body.

In this configuration, as the decompressed space is provided between the outer cylinder and the inner cylinder using the fit body fitted between the wooden or bamboo outer cylinder and the wooden or bamboo inner cylinder, it is possible to increase the heat insulation performance of the heat-insulated container for beverages having a wooden or bamboo appearance to a considerably high degree. Furthermore, by using wood or bamboo for forming both the outer cylinder and the inner cylinder, it becomes possible to manufacture the heat-insulated container for beverages while increasing the usage of wood or bamboo and effectively using wood or bamboo as a material resulting from thinning and the like. Furthermore, the appearance of the heat-insulated container for beverages is an appearance of wood or bamboo in its entirety or in a major part. This allows the heat-insulated container for beverages to have an appearance given the beauty of wood or bamboo. Moreover, a woodgrain pattern or a bamboo pattern in the appearance of the heat-insulated container for beverages such as grain on the wood or bamboo outer cylinder differs between containers. This achieves increase in the individuality or uniqueness of the heat-insulated container for beverages as an individual product to a considerably high degree, making it possible to respond to demand from a consumer having a high level of unique preference. In addition, if wood or bamboo is exposed or if a coating is applied to a thickness allowing reflection of surface asperity of the wood or bamboo on an external surface of the wooden or bamboo outer cylinder or on an external surface of a wooden or bamboo exterior body if the lid body includes such a wooden or bamboo exterior body, the asperity or a level difference on the external surface of the outer cylinder or on the external surface of the lid body can be increased compared to an external surface made of resin or metal. This makes it possible to shorten survival time of a virus adhering to the surface to achieve increased virus resistance.

The heat-insulated container for beverages of the present invention is characterized in that an externally projecting flange part is provided at an upper portion of the inner cylinder, the fit body is fitted over the inner cylinder in such a manner that an upper end of the fit body abuts on the flange part, and an upper end part of the outer cylinder is fixedly attached to the flange part.

This configuration allows the position of the fit body to be determined easily and correctly by forming abutting contact of the fit body with the flange part, thereby allowing the work of manufacturing the heat-insulated container for beverages to be done easily and efficiently. Moreover, the fit body is hidden in such a manner as to be covered under the flange part to be prevented from being recognized visually from above, allowing the wooden appearance to be ensured more favorably.

The heat-insulated container for beverages of the present invention is characterized in that an upper end of the fit body is arranged externally to a peripheral wall part of the inner wall of the fit body.

This facilitates fitting of the fit body over the inner cylinder, allowing the work of manufacturing the heat-insulated container for beverages to be done easily and efficiently.

The heat-insulated container for beverages of the present invention is characterized in that a recessed part recessed externally is formed peripherally in an intermediate region of an inner surface of a peripheral wall part of the outer cylinder as viewed in a lengthwise direction.

In this configuration, in fitting the outer cylinder over the fit body, an area of contact between an inner surface of the peripheral wall part of the outer cylinder and an outer peripheral surface of the outer wall of the fit body is reduced. Thus, it becomes possible to reduce frictional resistance to facilitate fitting of the outer cylinder over the fit body, allowing the work of manufacturing the heat-insulated container for beverages to be done easily and efficiently. Furthermore, the presence of the peripherally formed recessed part makes it possible to provide further heat-insulated space between the outer peripheral surface of the outer wall of the fit body and the peripheral wall part of the outer cylinder, allowing the heat insulation performance of the heat-insulated container for beverages to be increased to a still higher degree.

The heat-insulated container for beverages of the present invention is characterized in that the inner cylinder includes an upper peripheral wall part provided over the peripheral wall part around the beverage storage space of the inner cylinder and covered with the lid body, the lid body includes a wooden or bamboo exterior part and a lid-side thread part threadedly engaged with a thread part of the upper peripheral wall part, and heat-insulated space is provided inside the exterior part.

In this configuration, in the heat-insulated container for beverages with the lid body, heat insulation performance can be improved further at the lid body using the heat-insulated space inside the exterior part of the lid body, allowing the heat insulation performance of the heat-insulated container for beverages to be increased to a still higher degree.

The heat-insulated container for beverages of the present invention is characterized in that the inner cylinder includes an upper peripheral wall part provided over the peripheral wall part around the beverage storage space of the inner cylinder and covered with the lid body, the lid body includes a wooden or bamboo exterior part, and the exterior part includes a lid-side female thread part threadedly engaged with a male thread part of the upper peripheral wall part.

In this configuration, on the occurrence of chipping of a tip and the like of the female thread part of the wooden or bamboo exterior part, the chipping can be prevented from mixing into a beverage in the container.

Advantageous Effects of Invention

The heat-insulated container for beverages of the present invention makes it possible to achieve high heat insulation performance and can be manufactured through effective use of wood or bamboo as a material resulting from thinning and the like. Moreover, the heat-insulated container for beverages can be a container having a considerably high degree of individuality with a woodgrain pattern or a bamboo pattern differing between containers and having an outer appearance with the beauty of wood or bamboo.

EMBODIMENTS FOR CARRYING OUT INVENTION

[Heat-Insulated Container for Beverages of Embodiment]

Figure 1:
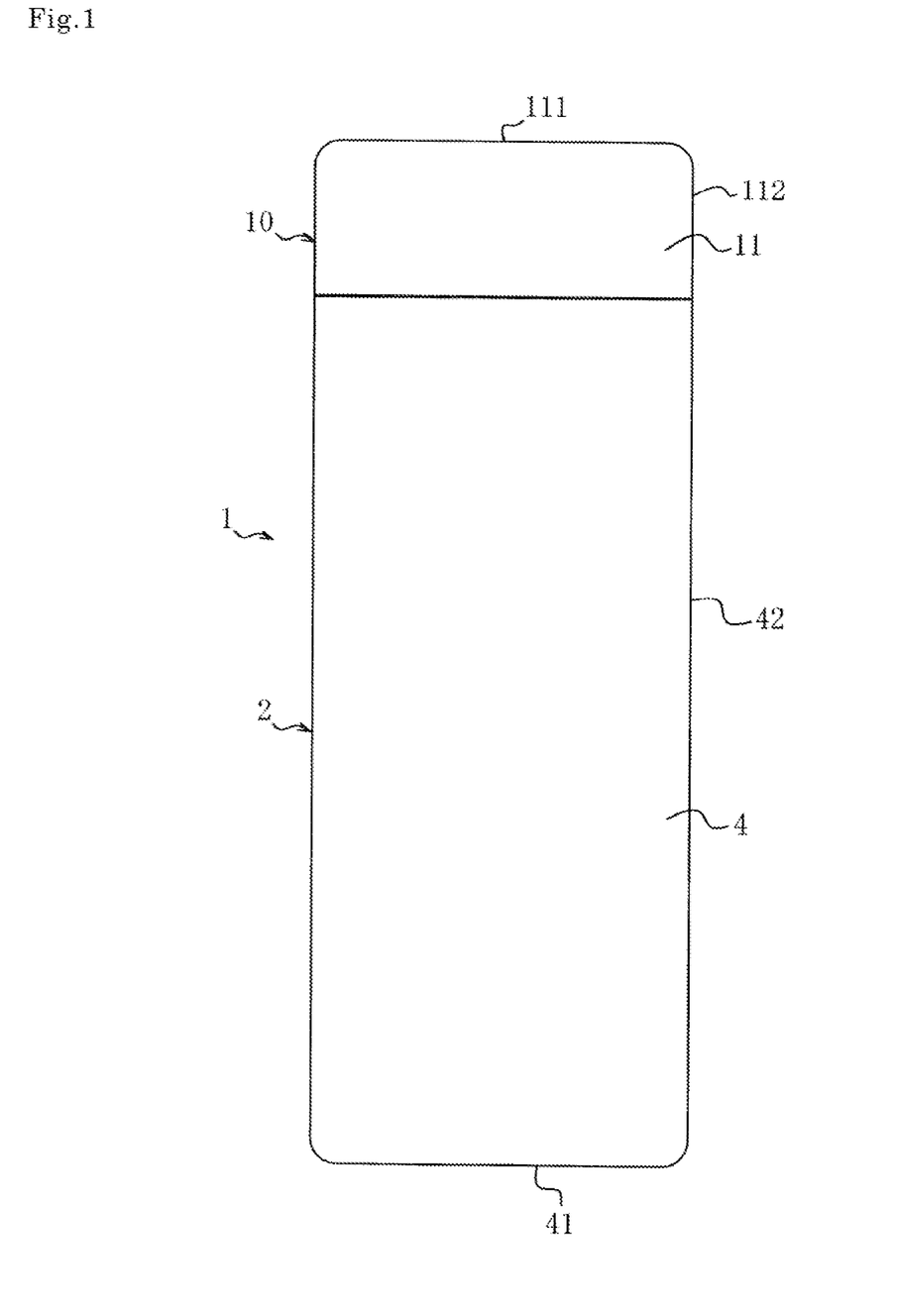
FIG. 1 is a front view showing a heat-insulated container for beverages according to an embodiment of the present invention.
Figure 2:
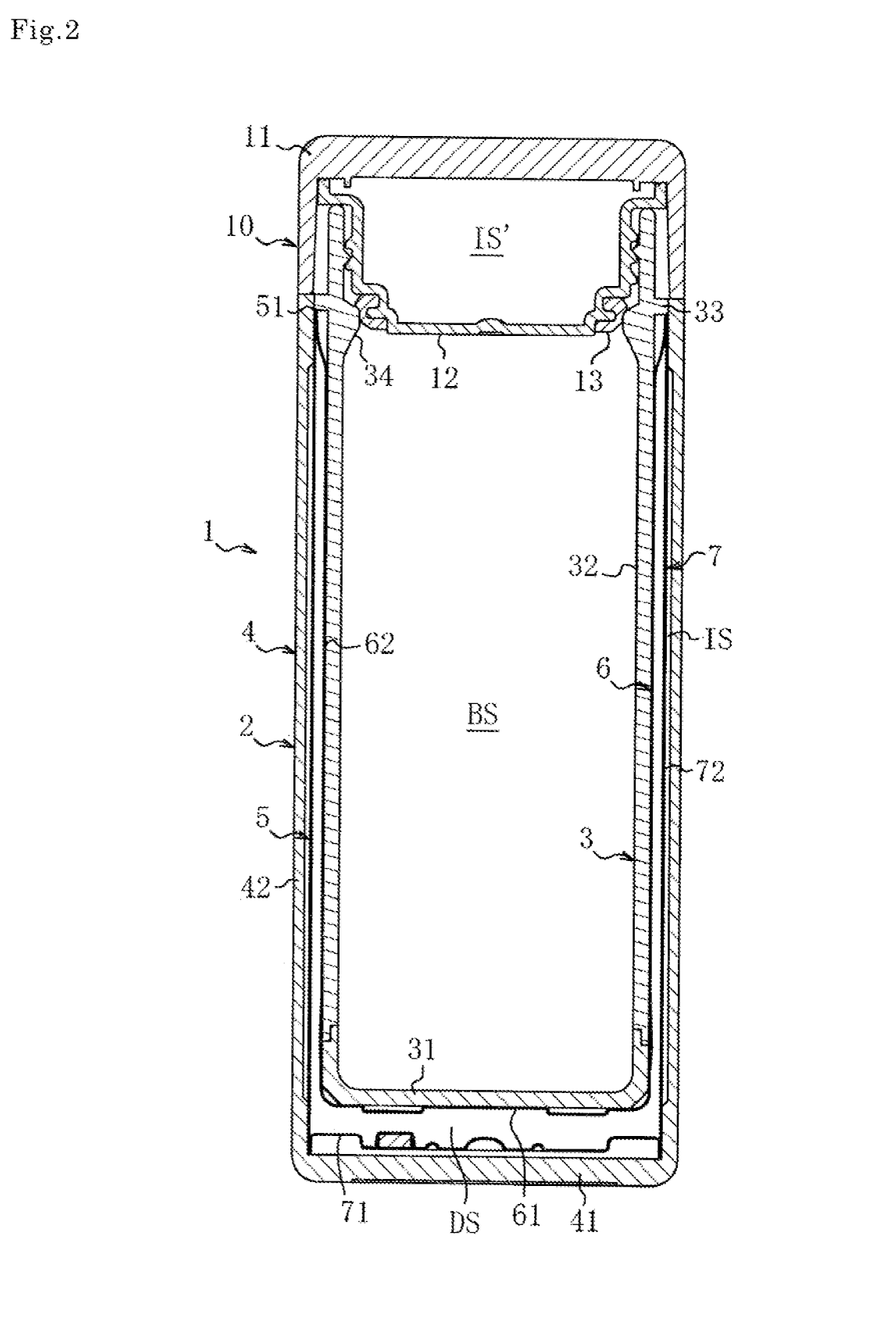
FIG. 2 is a vertical sectional view showing the heat-insulated container for beverages according to the embodiment.
Figure 3A:
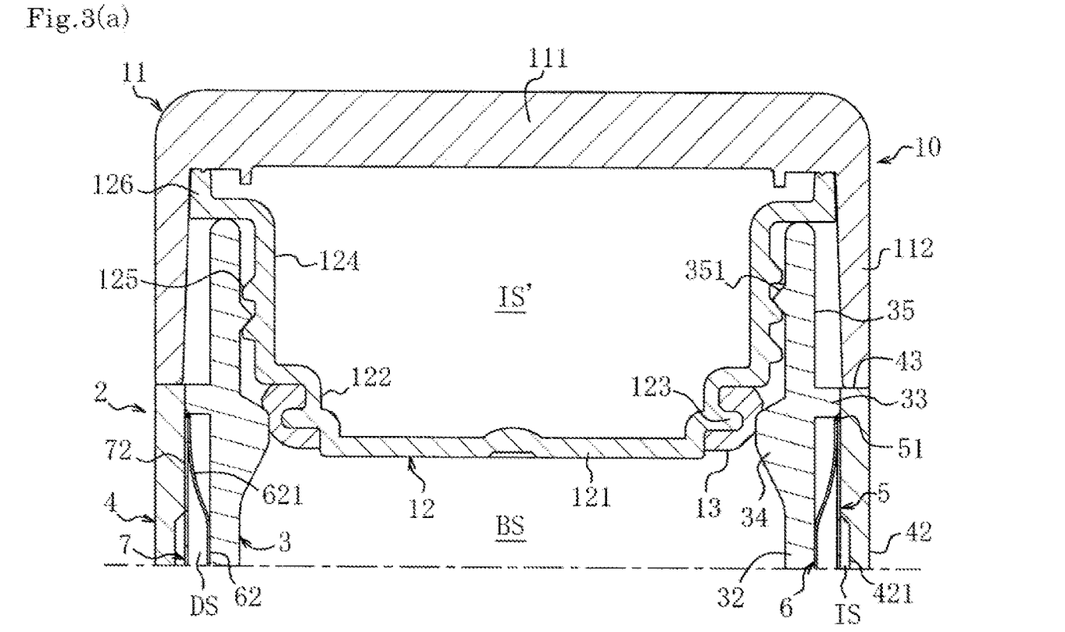
FIG. 3(a) is an enlarged vertical sectional view showing an upper section of the heat-insulated container for beverages according to the embodiment.
Figure 3B:
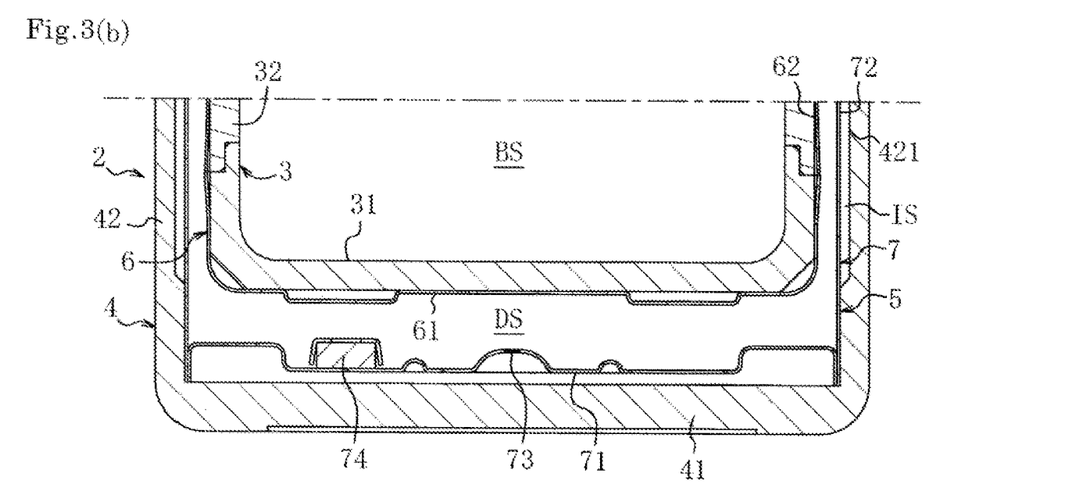
FIG. 3(b) is an enlarged vertical sectional view showing a lower section of the heat-insulated container for beverages according to the embodiment.
Figure 4:
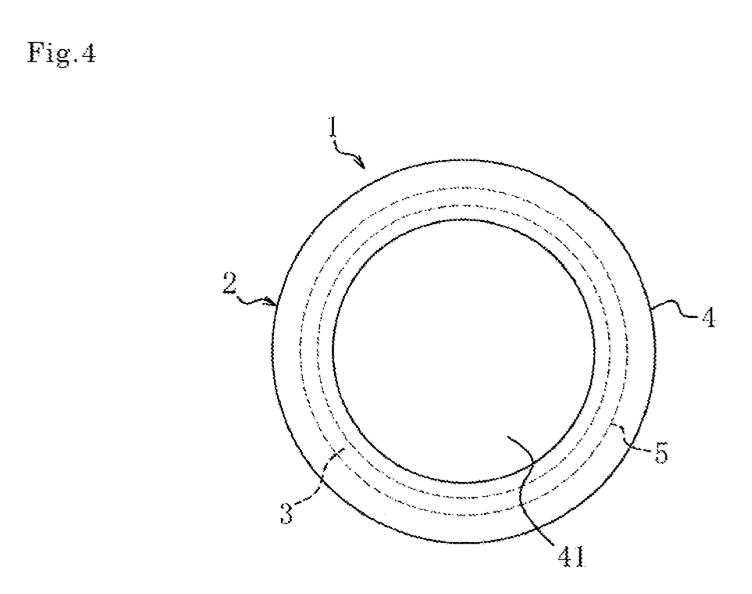
FIG. 4 is a bottom view showing the heat-insulated container for beverages according to the embodiment.

A heat-insulated container 1 for beverages of an embodiment of the present invention is to be used as a portable vacuum bottle or water bottle. As shown in FIGS. 1 to 4, the heat-insulated container 1 for beverages includes: a container body 2 composed of a wooden inner cylinder 3 having a substantially cylindrical shape with a closed bottom, a wooden outer cylinder 4 having a substantially cylindrical shape with a closed bottom, and a metallic fit body 5 having a substantially cylindrical shape with a closed bottom and having a double wall structure; and a lid body 10 threadedly and removably attached to the container body 2 and used for closing the container body 2 while allowing opening of the container body 2. The heat-insulated container 1 for beverages is configured in such a manner that the fit body 5 is interposed between the inner cylinder 3 and the outer cylinder 4. A type of wood for forming each of the wooden inner cylinder 3 and the wooden outer cylinder 4 is determined appropriately within an applicable range and is preferably a cypress material and the like resulting from thinning.

The wooden inner cylinder 3 of the present embodiment has a substantially circular cylindrical shape with a closed bottom, and includes a bottom part 31 and a peripheral wall part 32 surrounding beverage storage space BS. In the example shown in the drawings, an additional member forming the bottom part 31 and a lower end portion of the peripheral wall part 32 is fitted into a member forming a large portion of the peripheral wall part 32 and these members are fixedly attached to each other by adhesion and the like, thereby providing the bottom part 31 and the peripheral wall part 32. An externally projecting flange part 33 is provided at an upper portion of the inner cylinder 3. In the example shown in the drawings, the flange part 33 is provided in such a manner as to project externally at a position substantially corresponding to an upper end of the peripheral wall part 32.

A bulging part 34 is formed inside the position substantially corresponding to the upper end of the peripheral wall part 32 of the inner cylinder 3 in such a manner as to bulge inwardly. A ring-like sealing member 13 of the lid body 10 described later abuts on the bulging part 34 while the lid body 10 is closed, thereby preventing leakage of beverages stored in the beverage storage space BS. The inner cylinder 3 includes an upper peripheral wall part 35 provided over the peripheral wall part 32 around the beverage storage space BS of the inner cylinder 3 and covered with the lid body 10, and a female thread 351 corresponding to a thread part with which the lid body 10 is threadedly engaged is formed at an inner surface of the upper peripheral wall part 35. Moreover, in the example shown in the drawings, while the female thread 351 is formed at the inner surface of the upper peripheral wall part 35, an outer peripheral surface of the upper peripheral wall part 35 is entirely formed into a smooth curved surface. This provides favorable sense of touch on mouth when a user of the heat-insulated container 1 for beverages drinks a beverage with a mouth directly touching the upper peripheral wall part 35.

The wooden outer cylinder 4 of the present embodiment has a substantially circular cylindrical shape with a closed bottom, and includes a bottom part 41 and a peripheral wall part 42. A recessed part 421 recessed externally is formed peripherally in an intermediate region of an inner surface of the peripheral wall part 42 of the outer cylinder 4 as viewed in a lengthwise direction of the outer cylinder 4. For example, the recessed part 421 is formed peripherally over a region of equal to or greater than 70%, preferably, equal to or greater than 80% of the length of the peripheral wall part 42 as viewed in the lengthwise direction. The outer cylinder 4 includes an upper end part 43 abutting on an apical surface of the flange part 33 of the inner cylinder 3 from outside and fixedly attached to the flange part 33 by adhesion and the like.

The fit body 5 has a double wall structure where decompressed space DS is formed between a metallic inner wall 6 having a substantially cylindrical shape with a closed bottom and a metallic outer wall 7 having a substantially cylindrical shape with a closed bottom. The inner wall 6 of the present embodiment has a substantially circular cylindrical shape with a closed bottom, is composed of a bottom part 61 and a peripheral wall part 62, and is made of a thin metallic material having a substantially uniform thickness entirely. The bottom part 61 is provided with a certain folded shape in a sectional view to increase rigidity. The peripheral wall part 62 of the inner wall 6 has an upper end part 621 bent in such a manner as to project externally in an arc-like shape.

The outer wall 7 of the present embodiment has a substantially circular cylindrical shape with a closed bottom, is composed of a bottom part 71 and a peripheral wall part 72, and is made of a thin metallic material having a substantially uniform thickness entirely. The peripheral wall part 72 of the outer wall 7 extends linearly to an upper end part of the peripheral wall part 72. This upper end part has an inner surface where the upper end part 621 of the peripheral wall part 62 of the inner wall 6 is arranged in such a manner as to extend along the inner surface. The upper end of the peripheral wall part 72 of the outer wall 7 and the upper end of the peripheral wall part 62 of the inner wall 6 are fixedly attached to and closed with each other by welding in an overlapping state and the like, thereby forming an upper end 51 of the fit body 5. With the bent formation of the upper end part 621, the upper end 51 of the fit body 5 is arranged externally to the peripheral wall part 62 of the inner wall 6 of the fit body 5.

The bottom part 71 of the outer wall 7 is provided with a sealing part 73 for sealing a suction hole having been used for exhaust by vacuum suction from space between the inner wall 6 and the outer wall 7. A getter 74 is fitted internally on an inner surface of the bottom part 71 for absorbing gas in the space between the inner wall 6 and the outer wall 7 after sealing of the suction hole. The bottom part 71 is provided with a certain folded shape in a sectional view to increase rigidity.

The fit body 5 is fitted over the inner cylinder 3 in such a manner as to cover the bottom part 31 and the peripheral wall part 32 around the beverage storage space BS of the inner cylinder 3. The fit body 5 is fitted over the inner cylinder 3 in such a manner that the upper end 51 of the fit body 5 abuts on the flange part 33 of the inner cylinder 3. Specifically, in the present embodiment, the bottom part 61 of the inner wall 6 of the fit body 5 is formed into the same shape in a bottom view as the bottom part 31 of the inner cylinder 3 and into a slightly greater size in a bottom view than the bottom part 31. An inner peripheral surface of the peripheral wall part 62 of the inner wall 6 of the fit body 5 is formed into a slightly greater size than an outer peripheral surface of the peripheral wall part 32 of the inner cylinder 3. Furthermore, the peripheral wall part 62 of the inner wall 6 of the fit body 5 is formed at a height that is set substantially equal to a height from an external surface of the bottom part 31 of the peripheral wall part 32 to the flange part 33 of the inner cylinder 3.

The wooden outer cylinder 4 is fitted over the fit body 5 in such a manner as to cover the bottom part 71 and the peripheral wall part 72 of the outer wall 7 of the fit body 5, and is arranged in such a manner that an upper end surface of the peripheral wall part 42 of the outer cylinder 4 fitted over the fit body 5 is substantially flush with an upper surface of the flange part 33 of the inner cylinder 3. Specifically, in the present embodiment, the bottom part 41 of the outer cylinder 4 is formed into the same shape in a bottom view as the bottom part 71 of the outer wall 7 of the fit body 5 and into a greater size in a bottom view than the bottom part 71. An inner peripheral surface of the peripheral wall part 42 of the outer cylinder 4 is formed into a slightly greater size than an outer peripheral surface of the peripheral wall part 72 of the outer wall 7 of the fit body 5. Furthermore, the peripheral wall part 42 of the outer cylinder 4 is formed to an inner height that is set substantially equal to a value corresponding to a sum of the height of the peripheral wall part 72 of the outer wall 7 of the fit body 5 and the thickness of the flange part 33.

The lid body 10 includes a wooden exterior part 11. The exterior part 11 of the present embodiment is formed into a substantially angular U-shape in a sectional view composed of a top plate 111 and a peripheral wall part 112. A type of wood for forming the wooden exterior part 11 is determined appropriately within an applicable range and is preferably a cypress material and the like resulting from thinning, for example. An interior part 12 having a substantially angular U-shape in a sectional view is fitted inside the wooden exterior part 11 while the angular U-shape of the interior part 12 is inverted from that of the exterior part 11. While the interior part 12 is made of synthetic resin, for example, it may be made of wood.

The interior part 12 includes a bottom plate 121 and a sealing member fit-in part 122 provided in such a manner as to rise from a periphery of the bottom plate 121. The sealing member fit-in part 122 includes a ring-like projection 123 in which a ring-like sealing member 13 made of rubber is fitted. While the lid body 10 is closed, the sealing member 13 seals the beverage storage space BS while abutting on the bulging part 34 of the inner cylinder 3 in such a manner as to be pressed against the bulging part 34.

The interior part 12 is provided with a peripheral wall 124 provided in such a manner as to rise from the sealing member fit-in part 122. The peripheral wall 124 has an outer peripheral surface where a male thread 125 is formed that corresponds to a lid-side thread part threadedly engaged with the female thread 351 at an inner peripheral surface of the upper peripheral wall part 35 of the inner cylinder 3. Furthermore, a bent part 126 is formed that has a substantially L-bent shape in a sectional view extending externally from the upper end of the peripheral wall 124 and then extending upwardly. The bent part 126 has an outer peripheral surface fitted to an inner peripheral surface of the peripheral wall part 112 of the exterior part 11. A tip of the bent part 126, in other words, the upper end of the interior part 12 abuts on the top plate 111 of the exterior part 11 and is fixedly attached to the top plate 111 by adhesion and the like.

Space surrounded by the top plate 111 of the exterior part 11 and the interior part 12 is heat-insulated space IS' formed of an air layer. The heat-insulated space IS' is provided inside the exterior part 11 of the lid body 10. With the presence of the heat-insulated space IS' of the lid body 10, heat insulation performance on the open side of the container body 2 is increased.

According to the heat-insulated container 1 for beverages of the present embodiment, by the presence of the decompressed space DS provided between the outer cylinder 4 and the inner cylinder 3 using the fit body 5 fitted between the wooden outer cylinder 4 and the wooden inner cylinder 3, it is possible to increase the heat insulation performance of the heat-insulated container 1 for beverages having a wooden appearance to a considerably high degree. Furthermore, by using wood for forming both the outer cylinder 4 and the inner cylinder 3 and using wood for further forming the exterior part 11 of the lid body 10, it becomes possible to manufacture the heat-insulated container 1 for beverages while increasing the usage of wood and effectively using wood as a material resulting from thinning and the like.

The appearance of the heat-insulated container 1 for beverages composed of the wooden outer cylinder 4 of the container body 2 and the wooden exterior part 11 of the lid body 10 is an appearance of wood in its entirety. This allows the heat-insulated container 1 for beverages to have an appearance entirely given the beauty of wood. Moreover, a woodgrain pattern of the wooden outer cylinder 4 or a woodgrain pattern of the wooden exterior part 11 differs between containers. This allows increase in the individuality or uniqueness of the heat-insulated container 1 for beverages as an individual product to a considerably high degree, making it possible to respond to demand from a consumer having a high level of unique preference.

In fitting the fit body 5 over the inner cylinder 3, it is possible to determine the position of the fit body 5 easily and correctly by forming abutting contact of the fit body 5 with the flange part 33, thereby allowing the work of manufacturing the heat-insulated container 1 for beverages to be done easily and efficiently. Moreover, the fit body 5 is hidden in such a manner as to be covered under the flange part 33 to be prevented from being recognized visually from above, allowing the wooden appearance to be ensured more favorably. Furthermore, arranging the upper end 51 of the fit body 5 externally to the peripheral wall part 62 of the inner wall 6 of the fit body 5 facilitates fitting of the fit body 5 over the inner cylinder 3, allowing the work of manufacturing the heat-insulated container 1 for beverages to be done easily and efficiently.

By the presence of the recessed part 421 of the outer cylinder 4, in fitting the outer cylinder 4 over the fit body 5, an area of contact between an inner surface of the peripheral wall part 42 of the outer cylinder 4 and an outer peripheral surface of the outer wall 7 of the fit body 5 is reduced. Thus, it becomes possible to reduce frictional resistance to facilitate fitting of the outer cylinder 4 over the fit body 5, allowing the work of manufacturing the heat-insulated container 1 for beverages to be done easily and efficiently. Furthermore, the presence of the peripherally formed recessed part 421 makes it possible to provide further heat-insulated space IS between the outer peripheral surface of the outer wall 7 of the fit body 5 and the peripheral wall part 42 of the outer cylinder 4, allowing the heat insulation performance of the heat-insulated container 1 for beverages to be increased to a still higher degree.

In the heat-insulated container 1 for beverages with the lid body 10, heat insulation performance can be improved further at the lid body 10 using the heat-insulated space IS' inside the exterior part 11 of the lid body 10, allowing the heat insulation performance of the heat-insulated container 1 for beverages to be increased to a still higher degree.

Scope of Invention Disclosed in this Specification

The invention disclosed in this specification includes, in addition to the configurations according to the respective inventions, embodiments, and modifications thereof listed as inventions, a matter defined by modifying any of these partial configurations into other configurations disclosed in this specification within an applicable range, a matter defined by adding any other configurations disclosed in this specification to these partial configurations, or a matter defined into a generic concept by cancelling any of these partial configurations within a limit that achieves a partial operational advantage. The invention disclosed in this specification further covers modifications and additions described below.

For example, the heat-insulated container 1 for beverages of the above-described embodiment is composed of the container body 2 and the lid body 10. Meanwhile, the heat-insulated container for beverages of the present invention further covers a heat-insulated container for beverages such as a mug or a soup cup not including a lid body but composed only of a wooden inner cylinder having a substantially cylindrical shape with a closed bottom, a wooden outer cylinder having a substantially cylindrical shape with a closed bottom, and a fit body interposed between the inner cylinder and the outer cylinder and having decompressed space that correspond to a container body. The heat-insulated container for beverages of the present invention is not limited to a portable vacuum bottle or water bottle but is applicable to an appropriate heat-insulated container for beverages within a range of the purport of the present invention such as a tabletop vacuum bottle, for example.

In the heat-insulated container 1 for beverages of the above-described embodiment, wood is used for forming the inner cylinder 3 and the outer cylinder 4 of the container body 2 and the exterior body 11 of the lid body 10, and if necessary, the interior part 12 of the lid body 10. However, bamboo may be used preferably for forming all or some of these parts.

In the configuration of the above-described embodiment, the male thread 125 of the interior part 12 of the lid body 10 is threadedly engaged with the female thread 351 of the upper peripheral wall part 35 of the inner cylinder 3 of the container body 2. In another favorable configuration, the lid body 10 may be composed of the wooden or bamboo exterior part 11 or composed of the exterior part 11 and an interior part provided in response to need, a male thread part may be formed at an outer periphery of the upper peripheral wall part 35 of the inner cylinder 3 of the container body 2 and a lid-side female thread part may be formed at the wooden or bamboo exterior part 11 of the lid body 10, and the lid-side female thread part of the exterior part 11 may be threadedly engaged with the male thread part of the upper peripheral wall part 35 to close the heat-insulated container for beverages of the present invention while allowing opening of the heat-insulated container for beverages. In this configuration, on the occurrence of chipping of a tip and the like of the female thread part of the wooden or bamboo exterior part, the chipping can be prevented from mixing into a beverage in the container.

INDUSTRIAL APPLICABILITY

The present invention is usable as a heat-insulated container for beverages.

REFERENCE SIGNS LIST

1 . . . Heat-insulated container for beverages
2 . . . Container body
3 . . . Inner cylinder
31 . . . Bottom part
32 . . . Peripheral wall part
33 . . . Flange part
34 . . . Bulging part
35 . . . Upper peripheral wall part
351 . . . Female thread
4 . . . Outer cylinder
41 . . . Bottom part
42 . . . Peripheral wall part
421 . . . Recessed part
43 . . . Upper end part
5 . . . Fit body
51 . . . Upper end
6 . . . Inner wall
61 . . . Bottom part
62 . . . Peripheral wall part
621 . . . Upper end part
7 . . . Outer wall
71 . . . Bottom part
72 . . . Peripheral wall part
73 . . . Sealing part
74 . . . Getter
10 . . . Lid body
11 . . . Exterior part
111 . . . Top plate
112 . . . Peripheral wall part
12 . . . Interior part
121 . . . Bottom plate
122 . . . Sealing member fit-in part
123 . . . Projection
124 . . . Peripheral wall
125 . . . Male thread
126 . . . Bent part
13 . . . Sealing member
BS . . . Beverage storage space
DS . . . Decompressed space
IS, IS' . . . Heat-insulated space

The invention claimed is:

1. A heat-insulated container for beverages comprising:
a wooden or bamboo inner cylinder having a substantially cylindrical shape with a closed bottom;
a wooden or bamboo outer cylinder having a substantially cylindrical shape with a closed bottom; and
a fit body where decompressed space is provided between an inner wall having a substantially cylindrical shape with a closed bottom and an outer wall having a substantially cylindrical shape with a closed bottom, wherein
the fit body is fitted over the inner cylinder in such a manner as to cover a bottom part and a peripheral wall part around beverage storage space of the inner cylinder, and
the outer cylinder is fitted over the fit body in such a manner as to cover a bottom part and a peripheral wall part of the outer wall of the fit body.

2. The heat-insulated container for beverages according to claim 1, wherein
an externally projecting flange part is provided at an upper portion of the inner cylinder,
the fit body is fitted over the inner cylinder in such a manner that an upper end of the fit body abuts on the flange part, and
an upper end part of the outer cylinder is fixedly attached to the flange part.

3. The heat-insulated container for beverages according to claim 1, wherein
an upper end of the fit body is arranged externally to a peripheral wall part of the inner wall of the fit body.

4. The heat-insulated container for beverages according to claim 2, wherein
an upper end of the fit body is arranged externally to a peripheral wall part of the inner wall of the fit body.

5. The heat-insulated container for beverages according to claim 1, wherein
a recessed part recessed externally is formed peripherally in an intermediate region of an inner surface of a peripheral wall part of the outer cylinder as viewed in a lengthwise direction.

6. The heat-insulated container for beverages according to claim 2, wherein
a recessed part recessed externally is formed peripherally in an intermediate region of an inner surface of a peripheral wall part of the outer cylinder as viewed in a lengthwise direction.

7. The heat-insulated container for beverages according to claim 3, wherein
a recessed part recessed externally is formed peripherally in an intermediate region of an inner surface of a peripheral wall part of the outer cylinder as viewed in a lengthwise direction.

8. The heat-insulated container for beverages according to claim 4, wherein
a recessed part recessed externally is formed peripherally in an intermediate region of an inner surface of a peripheral wall part of the outer cylinder as viewed in a lengthwise direction.

9. The heat-insulated container for beverages according to claim 1, wherein
the inner cylinder includes an upper peripheral wall part provided over the peripheral wall part around the beverage storage space of the inner cylinder and covered with the lid body,
the lid body includes a wooden or bamboo exterior part and a lid-side thread part threadedly engaged with a thread part of the upper peripheral wall part, and
heat-insulated space is provided inside the exterior part.

10. The heat-insulated container for beverages according to claim 2, wherein
the inner cylinder includes an upper peripheral wall part provided over the peripheral wall part around the beverage storage space of the inner cylinder and covered with the lid body,
the lid body includes a wooden or bamboo exterior part and a lid-side thread part threadedly engaged with a thread part of the upper peripheral wall part, and
heat-insulated space is provided inside the exterior part.

11. The heat-insulated container for beverages according to claim 3, wherein the inner cylinder includes an upper peripheral wall part provided over the peripheral wall part around the beverage storage space of the inner cylinder and covered with the lid body, the lid body includes a wooden or bamboo exterior part and a lid-side thread part threadedly engaged with a thread part of the upper peripheral wall part, and heat-insulated space is provided inside the exterior part.

12. The heat-insulated container for beverages according to claim 5, wherein the inner cylinder includes an upper peripheral wall part provided over the peripheral wall part around the beverage storage space of the inner cylinder and covered with the lid body, the lid body includes a wooden or bamboo exterior part and a lid-side thread part threadedly engaged with a thread part of the upper peripheral wall part, and heat-insulated space is provided inside the exterior part.

13. The heat-insulated container for beverages according to claim 1, wherein the inner cylinder includes an upper peripheral wall part provided over the peripheral wall part around the beverage storage space of the inner cylinder and covered with the lid body, the lid body includes a wooden or bamboo exterior part, and the exterior part includes a lid-side female thread part threadedly engaged with a male thread part of the upper peripheral wall part.

14. The heat-insulated container for beverages according to claim 2, wherein the inner cylinder includes an upper peripheral wall part provided over the peripheral wall part around the beverage storage space of the inner cylinder and covered with the lid body, the lid body includes a wooden or bamboo exterior part, and the exterior part includes a lid-side female thread part threadedly engaged with a male thread part of the upper peripheral wall part.

15. The heat-insulated container for beverages according to claim 3, wherein the inner cylinder includes an upper peripheral wall part provided over the peripheral wall part around the beverage storage space of the inner cylinder and covered with the lid body, the lid body includes a wooden or bamboo exterior part, and the exterior part includes a lid-side female thread part threadedly engaged with a male thread part of the upper peripheral wall part.

16. The heat-insulated container for beverages according to claim 5, wherein the inner cylinder includes an upper peripheral wall part provided over the peripheral wall part around the beverage storage space of the inner cylinder and covered with the lid body, the lid body includes a wooden or bamboo exterior part, and the exterior part includes a lid-side female thread part threadedly engaged with a male thread part of the upper peripheral wall part.

\* \* \* \* \*